(12) United States Patent
Germanetti

(10) Patent No.: US 6,400,282 B1
(45) Date of Patent: Jun. 4, 2002

(54) SYSTEM FOR MONITORING THE OPERATION OF AN AIRCRAFT, ESPECIALLY A HELICOPTER

(75) Inventor: Serge Alexandre Marc Germanetti, Marseilles (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/312,613

(22) Filed: May 17, 1999

(30) Foreign Application Priority Data

May 18, 1998 (FR) .............................. 98 06228

(51) Int. Cl.$^7$ .............................................. G01C 23/00
(52) U.S. Cl. ..................... 340/971; 73/178 H; 340/945; 340/946; 701/3; 701/14
(58) Field of Search ................................ 340/945, 946, 340/963, 971; 701/3, 9, 14, 35; 244/17.11; 73/178 H

(56) References Cited

U.S. PATENT DOCUMENTS

| | | | | |
|---|---|---|---|---|
| 3,590,636 A | * | 7/1971 | Eddy, Jr. | |
| 4,494,210 A | * | 1/1985 | Miller | 340/945 |
| 4,780,838 A | * | 10/1988 | Adelson | 340/945 |
| 5,270,931 A | * | 12/1993 | Appleford | |
| 5,454,074 A | * | 9/1995 | Hartel et al. | 434/50 |
| 5,475,594 A | * | 12/1995 | Oder et al. | 340/971 |
| 5,736,922 A | * | 4/1998 | Goode, III et al. | 340/971 |
| 6,038,498 A | * | 3/2000 | Briffe et al. | 340/954 |

OTHER PUBLICATIONS

French Search Report dated Feb. 5, 1999.
J. Morgan, et al., "MD–11 Electronic Instrument Systems", Proceedings of the Digitall Avionics Systems Conference, Seattle, Oct. 5–8, 1992, No. Conf. 11, Oct. 5, 1992, pp. 248–253, XP000366695, Institute of Electrical and Electronics Engineers.

K. R. Runyon, "Advance Graphics Processor," Proceedings of the AIAA/IEEE Digital Avionics Systems Conference, New York, Oct. 25–28, 1993, No. Conf. 12, Oct. 25, 1993, pp. 394–399, XP000451689, Institute of Electrical and Electronics Engineers.
P. Weindorf, "The C–17 Multifunction Display a Building Block for Avionic Systems," Proceedings of the National Aerospace and Electronics Conference (NAECON), Dayton, May 18–22,1992, vol. 2, No. Conf. 44, May 18, 1992, pp. 836–842, XP000339662, Institute of Electrical and Electronics Engineers.
R. Farmer, "The Mission Computer/Electronic Display Subsystem for the C–17A Avionics Suite," Proceedings of the National Aerospace and Electronics Conference (NAECON), Dayton, May 18–22, 1992, vo. 2, No. Conf. 44, May 18, 1992, pp. 843–846, XP000339663, Institute of Electrical and Electronics Engineers.
P. J. Gorder, et al., "The Role of Automation in the Integrated Cockpit of Tomorrow's General Aviation Aircraft," 1995 IEEE International Conference on Systems, Man and Cybernetics, Vancouver, Oct. 22–25, 1995, vol. 5, Oct. 22, 1995, pp. 4196–4200, XP000678324, Institute of Electrical and Electronics Engineers.

* cited by examiner

Primary Examiner—Brent A. Swarthout
(74) Attorney, Agent, or Firm—Stevens, Davis, Miller & Mosher, LLP

(57) ABSTRACT

A system for monitoring the operation of an aircraft, especially a helicopter, includes data acquisition and processing components and display components which are able to display at least one indicator for at least one parameter relating to the operation of the aircraft. The system furthermore includes selection components which allow an operator to select at least one option for a specific configuration of the system, and components able to automatically configure, during the selection of at least one option, at least the data acquisition, processing and display components so as to adapt them to the selected option.

17 Claims, 2 Drawing Sheets

SYSTEM FOR MONITORING THE OPERATION OF AN AIRCRAFT, ESPECIALLY A HELICOPTER

BACKGROUND OF THE INVENTION

1. Field of the Invention

The present invention relates to a system for monitoring the operation of an aircraft, especially a helicopter.

More precisely, it relates to a monitoring system of the type comprising:

data acquisition and processing means; and display means able to display in real time on specific indicators the value of specified parameters, such as the altitude or the speed of the aircraft, for example.

2. Description of the Related Art

In a known manner, such an indicator, for example a speed indicator, according to a first type of known indicator is generally formed so as to indicate the corresponding parameter or parameters in a unit or a specified system of units, for example in km/h, kt, . . . , in respect of the speed.

Accordingly, for each parameter considered there are as many different indicators as there are units able to be used in respect of this parameter.

This first type of known indicator does not allow a user of the aircraft to modify the unit or the system of units used, without replacing the corresponding indicator. Also, by reason in particular of the time and work which this involves, it is only conceivable to replace a small number of such indicators.

A second type of known indicator comprises indicators capable of outputting values in one of a plurality of units which are recorded and are able to be modified freely by an operator. To carry out such a modification, it is generally necessary simply to actuate an appropriate means, such as a button, for example.

Accordingly, it is not necessary to replace the relevant indicator should a unit be modified.

However, although the modification of a few units is thus easily and rapidly achievable with this type of indicator, the same does not hold when changing an entire system of units, since such a change involves modifying a very large number of references both with regard to all the existing indicators and with regard to various data acquisition and processing means of the aircraft and therefore requires a considerable and lengthy amount of irksome work.

From an article by Morgan entitled "MD-11 Electronic Instrument System" and presented at a conference ("Proceedings of the digital avionics systems conference") in October 1992, a system for monitoring the operation of an aircraft is known which comprises acquisition and processing means and display means, as well as reconfiguring means and which provides the capability of selecting options. The acquisition and processing means and the display means are at least partially reconfigurable.

However, reconfiguration has the sole aim of maintaining the display of certain data in case of a fault. This known embodiment would appear to be much like the aforesaid second type of known indicator. Thus, the selecting of options would seem to relate only to certain very specific references [selecting of units (° F. or ° C.), choice of display format, etc.] and not selection relating to a global reconfiguring of the system.

SUMMARY OF THE INVENTION

The object of the present invention is to remedy these drawbacks.

It relates to a system for monitoring the operation of an aircraft, especially a helicopter able to be configured rapidly and totally, without having to undertake any large task.

For this purpose, according to the invention, said system for monitoring the operation of an aircraft, especially a helicopter, comprising data acquisition and processing means and display means which are able to display at least one indicator of at least one parameter relating to the operation of said aircraft, is noteworthy in that it furthermore comprises:

selection means allowing an operator to select at least one option relating to a specific configuration of said system; and means able automatically and completely to configure, during the selection of at least one option, at least said data acquisition and processing means and said display means so as to adapt them to said option.

Thus, by virtue of the invention, by simply selecting an option, said monitoring system is automatically configured in such a way as to be adapted to said option, thus making it possible to remedy the aforesaid drawbacks and in particular the lengthy and irksome work required with regard to the known and aforesaid indicators.

Within the context of the present invention, the phrase configuring a system is understood to mean adapting it to a selected option, especially as regards the acquisition of data, their processing and their presentation to an operator, in such a way that said system can operate according to and/or allowing for said option.

To do this, according to the invention:

said display means are formed in such a way that their configuration entails at least one automatic adaptation of a symbology used for display. Preferably, said display means comprise for this purpose at least one screen furnished with a liquid crystal active matrix, on which various symbologies are stored; and/or said data acquisition and processing means are formed in such a way that their configuration entails at least an automatic adaptation of the processing operations which they implement.

According to the invention, an option able to be selected, either by a member of the crew during a flight, or by an operator on the ground, may in particular relate to:

the choice of at least one unit of values, for example an altitude unit, or of a plurality of units of values forming for example part of a new system of units which it is desired to install and use;

the choice of the fuel of the aircraft; and/or the presence or absence of at least one optional item of equipment on said aircraft.

Preferably, such an optional item of equipment corresponds to at least one of the following items of equipment of the aircraft:

a battery temperature probe;

an additional fuel tank;

a fuel flow rate meter;

a sling;

a cable under the aircraft;

a winch; and a non-totally interchangeable sensor, chosen with a view to multisource provisioning.

Moreover, in respect of such an optional item of equipment, advantageously:

the system in accordance with the invention comprises means for verifying the presence on the aircraft of said optional item of equipment, thus allowing said system to verify automatically that a possible option has been chosen; and said display means are able to display at least one characteristic sign indicating the optional items of equipment which have been selected and are present and, as appropriate, a fault with such an optional item of equipment.

Additionally, to facilitate the selecting of existing options, advantageously, said display means are formed in such a way as to be able to display a menu page indicating the various options able to be selected.

Moreover, advantageously, in order to be able to carry out predictive calculations:

the system in accordance with the invention comprises means allowing an operator to modify the weight recorded in said acquisition and processing means and relating to one of the following elements:
the aircraft empty of people but containing the items of equipment necessary for its mission;
the crew; and
the transported load; and/or said system comprises means allowing an operator to input the altitude of said aircraft and the outside temperature into said acquisition and processing means; and/or said acquisition and processing means are formed in such a way as to be able to calculate, on the basis of the altitude of the aircraft and of the outside temperature at the same altitude, at least one of the following weights of the aircraft:
the total weight;
the maximum weight with ground effect;
the maximum weight with ground effect with a wind;
the maximum weight without ground effect;
the maximum weight for a specified rate of climb; and
the weight corresponding to other possible trajectories of the aircraft or of the helicopter ("ad hoc touchdown").

Thus, the pilot can compare the first of above said weights respectively with each of the other weights and take the decisions which are called for or remain possible, such as to take additional weights on board or to adapt the altitude if the total weight is too great for example.

Moreover, advantageously, said system furthermore comprises:

means able to alert an operator, for example a pilot, when the weight of the aircraft is greater than a limit value, which is for example calculated; and/or sensors for automatically determining the weight of the fuel and the slung weight of the aircraft; and/or means for calculating weight-related centering and means for warning an operator when the calculated centering exceeds a specified limit value.

Additionally, the system in accordance with the invention comprises at least one, but preferably a plurality of replaceable modules, thus making it possible to rapidly repair any fault in said system, simply by replacing the module in which this fault originates.

Moreover, advantageously, said system is embodied, at least in part, in the form of a dual architecture. In particular, said acquisition and processing means preferably comprise at least two different acquisition and processing chains and said display means comprise at least two screens associated respectively with said acquisition and processing chains.

Thus, by virtue of this dual architecture of the system in accordance with the invention, its reliability and safety are considerably increased, since in case of a fault with a part of said system (for example a first screen), said system can continue to operate by means of the corresponding part which is not faulty (namely the second screen in the example considered).

DESCRIPTION OF THE DRAWINGS

The figures of the appended drawing will elucidate the manner in which the invention may be embodied. In these figures, identical references denote similar elements.

DETAILED DESCRIPTION OF THE INVENTION

Figure 1:
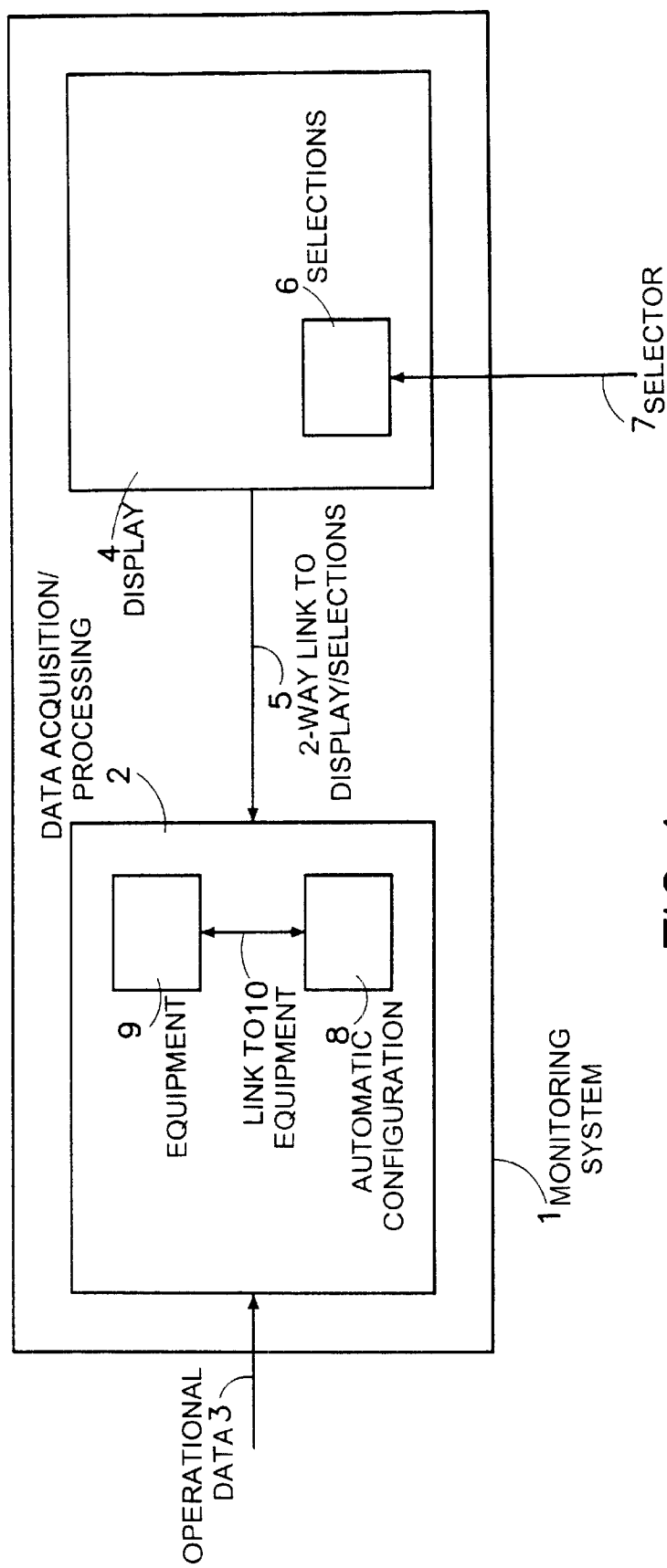
FIG. 1 is the schematic diagram of a monitoring system in accordance with the invention.

The system 1 in accordance with the invention and represented diagrammatically in FIG. 1 is intended to allow a pilot to monitor the operation of an aircraft, in this instance a helicopter (not represented).

Said system 1 is a system of known type, comprising:

data acquisition and processing means 2:
which receive data on the operation of the helicopter, such as for example values of characteristic parameters of the engine and/or of the main gearbox and/or information on the fuel or the external temperature, as represented in a general manner by a link 3; and
which carry out the processing of said data in such a way as to form flight information; and and display means 4 linked by a two-way link 5 to said means 2 and able to display said flight information, on at least one screen (not represented), which is installed in the cockpit of the helicopter.

For this purpose, said screen comprises a plurality of indicators of values, for example speed, altitude and/or weight indicators.

According to the invention, said system 1 furthermore comprises:

selection means 6 allowing an operator to select, as illustrated by an arrow 7, at least one option relating to a specific configuration of said system 1; and means 8 able automatically to configure, during the selection of at least one option, at least said data acquisition and processing means 2 and said display means 4 so as to adapt them to said option.

In the preferred embodiment, represented in FIG. 1 and corresponding to a simplified embodiment of the invention, said means 6 and 8 are integrated respectively into the means 4 and 2 and communicate with one another by way of the link 5.

Thus, by virtue of the invention, complete and automatic configuring of the system 1 is obtained by the action of the means 8 following the selecting of an option by an operator by way of the means 6, for example by actuating one or more buttons (not represented).

Accordingly, the means 8 adapt the system 1 to the option selected, especially as regards the acquisition of data, their processing and their presentation to an operator.

Hence, by virtue of the invention, the management of a large number of references is avoided. For example, for a specified item of equipment, it is no longer necessary, unlike the case of known systems, to manage as many variants as there are systems of units.

More precisely, according to the invention, such a configuration entails:

in respect of the means 4, at least one automatic adaptation of the symbology used. To do this, the screen or screens of said means 4 each comprise, according to the invention, a liquid crystal active matrix which allows the recording of a plurality of groups of symbols and the selecting of one of said groups for display; and in respect of the means 2, at least one automatic adaptation of the various processing operations implemented.

Within the context of the present invention, the options able to be selected may be of various kinds and may in particular be adapted to the type of aircraft used.

However, preferably, said options comprise at least the following various choices:

the choices of the units and/or of the systems of units used, such as for example the international system or the "imperial" system;

the choice of the helicopter fuel; and the choice relating to the presence or absence of optional items of equipment on said helicopter, and in particular a battery temperature probe, an additional fuel tank, a fuel flow rate meter, a sling, a cable under the aircraft and a winch.

According to the invention, the system 1 furthermore comprises means 9 which are linked by a link 10 to the means 8 and which are intended to verify, for example by means of an electrical interface test, the presence on the aircraft of a selected optional item of equipment, in order to remedy any selection error.

Furthermore, to avoid, as far as possible, the making of such a selection error, the means 4 are able to display a menu page indicating the various options able to be selected, as well as characteristic signs, for example an abbreviation, a term, a logo or a geometrical shape, indicating the optional items of equipment actually selected.

Said means 4 can also display, in a particularly advantageous embodiment, any fault with one of said optional items of equipment, thus allowing the pilot to differentiate between:

an unselected optional item of equipment, for which no characteristic sign is displayed; and a selected, but faulty, optional item of equipment, for which the means 4 display two characteristic signs, one of which relates to the selection and the other to the fault.

Additionally, although this is not represented in FIG. 1 for the sake of the clarity of the drawing, according to the invention, said system 1 is embodied:

in the form of a dual architecture and comprises in particular two monitoring chains comprising in each instance the means 2 and 3, thus allowing a considerable increase in reliability; and in the form of replaceable modules (for example one module per monitoring chain), thus guaranteeing a rapid and inexpensive repair in case of a fault with the system 1, since it is sufficient to replace the module in which the fault originates and it is therefore not necessary to involve the whole of said system 1.

Furthermore, the system 1 in accordance with the invention makes it possible to access various functional capabilities specified below.

In particular, it allows an operator, and specially a pilot, to determine and manage the weight-related performance of the helicopter.

For this purpose, on the basis of various fields C1 to C3 able to be displayed, said operator can modify respectively, as specified below with reference to FIG. 2:

the on-board weight M1, that is to say the weight of the helicopter empty but containing the items of equipment necessary for its mission;

the weight M2 of the crew; and the commercial weight M3, that is to say the weight of the "load" transported (people and/or objects transported).

On the basis of these weights M1 to M3, together with the weight M4 of the fuel (which is determined from the measured volume of the fuel and the temperature) and the slung weight M5 (which is measured by a sensor), the system 1 calculates the total weight M6 of the helicopter by means of the expression:

$$M6=M1+M2+M3+M4+M5.$$

Furthermore, according to the invention, said system 1 can also calculate:

from an altitude value Zpb, measured or input by an operator into the system 1, the outside temperature OATb, from the expression:

$$OATb=OATa+(6.5\times(Zpa-Zpb))$$

in which OATa and Zpa are nominal values of the temperature and of the altitude; and from an altitude value Zp and an outside temperature value OAT (these values are either measured values or values input into the system 1 by an operator, as specified below with reference to FIG. 2), the following weights of the aircraft: the maximum weight IGE with ground effect, the maximum weight IGE(WD) with ground effect with a wind, the maximum weight OGE without ground effect and the maximum weight OEI ROC for a specified climb at 150 ft/min, by means of known mathematical formulae.

The various aforesaid weights are displayed by way of the display means 4.

Thus, the pilot can compare the total weight M6 with each of said weights IGE, OGE, OGE(WD) and OEI ROC and take the decisions which are called for or remain possible, such as for example to take additional weights on board or to adapt the altitude if the total weight M6 is too great.

Described below is the automaton for dialog and presentation of information, represented in FIG. 2 and allowing an operator to dialog with the system 1, so that it calculates the aforesaid weights.

The dialog is carried out by actuating specific actuating means, for example buttons B1 to B3 provided on the means 6.

On the basis of the field C1 indicating an initial value of the weight M1, the operator can:

either directly access the field C2 relating to the weight M2, by actuating the button B1;

or modify the value of the weight M1, by way of the button B2 and enable it by way of the button B3, actuation of B1 after that of B2 making it possible to return to the aforesaid initial value.

Said automaton allows the weights M2 and M3 to be modified in an identical manner, on the basis of the fields C2 and C3 coming after the field C1.

A field C4 relating to the altitude Zp is accessed from said field C3.

Three possibilities are then offered to an operator:

to actuate the button B1 so that the automaton displays the nominal values of the altitude Zp and of the outside temperature OAT and on the basis of these values calculates the weights IGE, OGE, OGE(WD) and OEI ROC, as illustrated by a step V1;

to actuate the button B3 so as to access a field C5 relating to the outside temperature OAT; or to actuate the button B2 in such a way as to modify the value of the altitude Zp.

This modification can:

either be cancelled, by pressing the button B1, so as to access step V1;

or be enabled, by pressing the button B3 so that the automaton then calculates, on the basis of this value and a nominal value of OAT, in a step V2, the weights IGE, OGE, OGE(WD) and OEI ROC.

Figure 2:
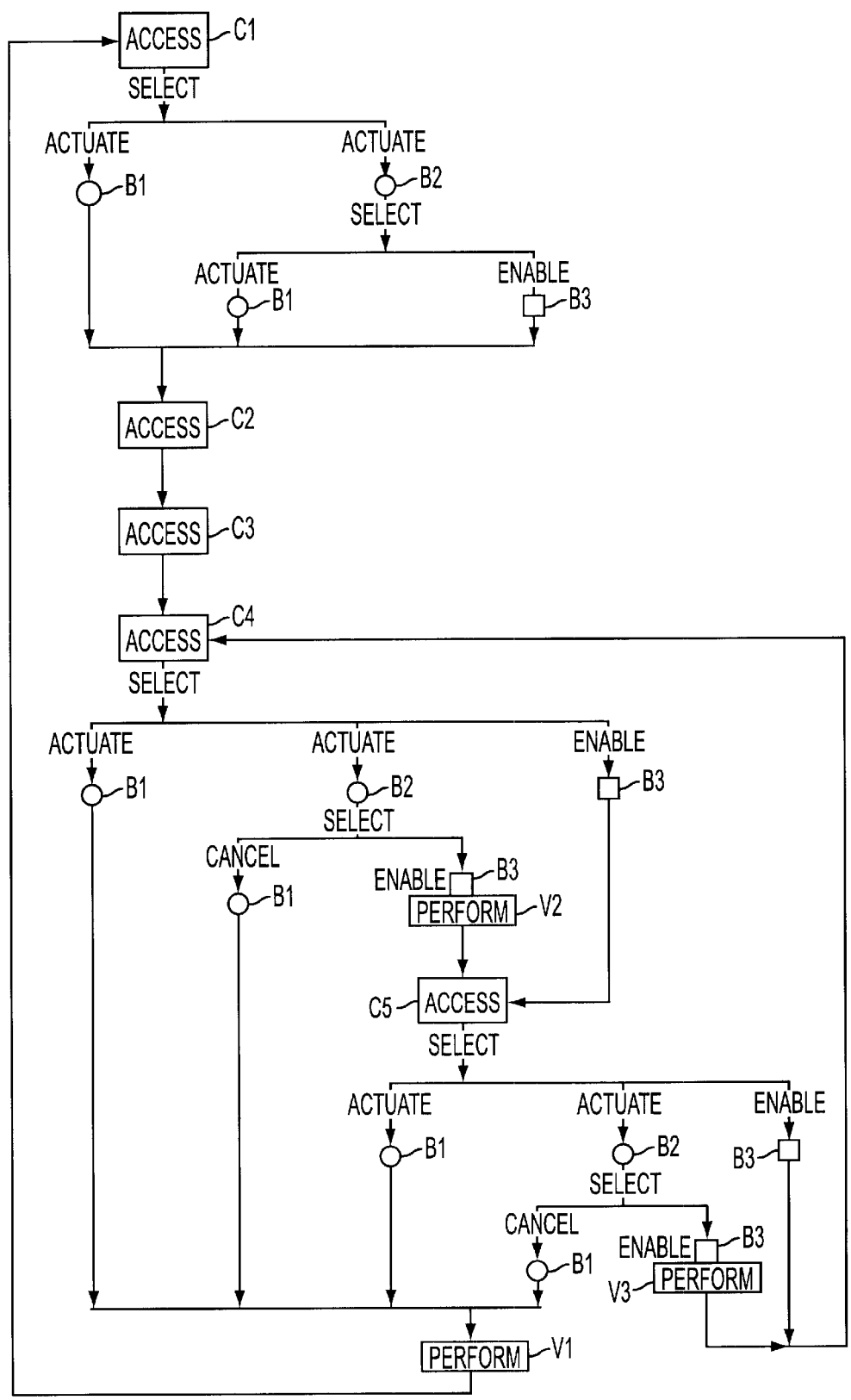
FIG. 2 diagrammatically illustrates an automaton for dialog and presentation of information.

On the basis of the field C5, the outside temperature OAT can be modified according to a procedure similar to that mentioned above and relating to the field C4, as may be seen in FIG. 2.

However, after a calculation step V3 or after the actuation of the button B3, the following field C1 is not accessed, rather the preceding field C4 is returned to so as to be able to remodify the altitude Zp.

This allows predictions to be made in respect of a plurality of different values Zp and OAT, as regards the weights IGE, OGE, OGE(WD) and OEI ROC.

According to the invention, said system 1 can have other functional capabilities which are not represented and which are intended in particular:

to alert an operator, for example a pilot of the helicopter, when the weight of the helicopter is greater than an acceptable limit value, which emanates from a calculation; and to carry out, automatically or at the request of an operator, a weight-related centering calculation allowing for the weight of the fuel and the slung weight, and to warn an operator when the centering thus calculated exceeds a value defined during certification of the helicopter.

What is claimed is:

1. A system for monitoring the operation of an aircraft, especially a helicopter, said monitoring system comprising:
   data acquisition and processing means for acquiring and processing data relating to the operation of the aircraft and for being configured, during the operation of the aircraft, at least partially by at least one automatic adaptation of a symbology used for display;
   display means for displaying at least one indicator of at least one parameter relating to the operation of said aircraft and for being configured, during the operation of the aircraft, at least partially;
   selection means for allowing an operator to select, during the operation of the aircraft, at least one option relating to a specific configuration of said system; and
   means for automatically and completely configuring, during selection of said at least one option by said selection means, at least said data acquisition and processing means and said display means to adapt them to said option, wherein said option relates at least to a presence or absence of at least one optional item of equipment on said aircraft, said optional item of equipment corresponds to at least one item selected from the following group:
      a battery temperature probe;
      an additional fuel tank;
      a fuel flow rate meter;
      a sling;
      a cable under the aircraft;
      a winch; and
      a non-totally interchangeable sensor, and
   wherein the system further comprises means for verifying the presence on the aircraft of said optional item of equipment.

2. The system as claimed in claim 1, wherein said display means comprise at least one screen including a liquid crystal active matrix, on which various symbologies are stored.

3. The system as claimed in claim 1, wherein said option relates at least to a choice of at least one unit of value.

4. The system as claimed in claim 1, wherein said option relates at least to a choice of fuel of the aircraft.

5. The system as claimed in claim 1, wherein said display means comprise means to display a characteristic sign indicating the optional items of equipment which have been selected.

6. The system as claimed in claim 1, wherein said display means comprise means to display a characteristic sign indicating a fault or the absence of an optional item of equipment present on the aircraft.

7. The system as claimed in claim 1, wherein said display means comprise means to display a menu page indicating the various options able to be selected.

8. The system as claimed in claim 1, further comprising means for allowing an operator to modify the weight recorded in said acquisition and processing means and relating to one of the following elements: the aircraft empty of people but containing the items of
   equipment necessary for its mission;
   the crew; and
   the transported load.

9. The system as claimed in claim 1, wherein said acquisition and processing means comprise means to calculate, on the basis of the altitude of the aircraft and of the outside temperature at the same altitude, at least one weight of the aircraft selected from the following group:
   the total weight;
   the maximum weight with ground effect;
   the maximum weight with ground effect with a wind;
   the maximum weight without ground effect;
   the maximum weight for a specified rate of climb; and
   the weight corresponding to other possible trajectories of the aircraft.

10. The system as claimed in claim 9, further comprising means for allowing an operator to input the altitude of said aircraft and the outside temperature into said acquisition and processing.

11. The system as claimed in claim 1, further comprising means for alerting an operator when the weight of the aircraft is greater than a specified limit value.

12. The system as claimed in claim 1, further comprising sensors for determining the weight of the fuel and the slung weight of the aircraft.

13. The system as claimed in claim 1, further comprising means for calculating weight-related centering and means for warning an operator when the calculated centering exceeds a specified limit value.

14. The system as claimed in claim 1, further comprising at least one replaceable module.

15. The system as claimed in claim 1, further comprising, at least in part, a dual architecture.

16. The system as claimed in claim 1, wherein said acquisition and processing means comprise at least two different acquisition and processing chains and wherein said display means comprise at least two screens associated respectively with said at least two acquisition and processing chains.

17. The system as claimed in claim 1, wherein said selection means allows said operator to select a configuration option during a flight, and said means for configuring performs said configuring of said data acquisition and processing means and said display means during said flight.

* * * * *